(12) United States Patent
Li (10) Patent No.: US 10,483,872 B2
(45) Date of Patent: Nov. 19, 2019

(54) POWER SUPPLY SYSTEM AND ENERGY STORAGE SYSTEM

(71) Applicant: GENERAL ELECTRIC COMPANY, Schenectady, NY (US)

(72) Inventor: Fei Li, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 572 days.

(21) Appl. No.: 15/086,218

(22) Filed: Mar. 31, 2016

(65) Prior Publication Data

US 2016/0294304 A1 Oct. 6, 2016

(30) Foreign Application Priority Data

Mar. 31, 2015 (CN) .......................... 2015 1 0149774

(51) Int. Cl.
*H02M 3/335* (2006.01)
*H02M 3/02* (2006.01)
(Continued)

(52) U.S. Cl.
CPC ............. *H02M 7/537* (2013.01); *B60L 1/006* (2013.01); *B60L 1/14* (2013.01); *B60L 50/40* (2019.02);
(Continued)

(58) Field of Classification Search
CPC ...... H02M 7/537; H02M 3/158; H02M 3/156; H02M 3/1584; B60L 1/006; B60L 1/14;
(Continued)

(56) References Cited

U.S. PATENT DOCUMENTS

| 7,252,165 B1 | 8/2007 | Gruenwald et al. |
| 7,259,469 B2 | 8/2007 | Brummett et al. |

(Continued)

FOREIGN PATENT DOCUMENTS

| CN | 1462108 A | 12/2003 |
| CN | 101427438 A | 5/2009 |

(Continued)

OTHER PUBLICATIONS

First Office Action issued in connection with corresponding MX Application No. MX/A/2016/004110 dated Mar. 21, 2018.

(Continued)

*Primary Examiner* — Brandon S Cole
(74) *Attorney, Agent, or Firm* — Meagher Emanuel Laks Goldberg & Liao, LLP (57) ABSTRACT

A power supply system to provide auxiliary power output comprising a first energy storage device, a first inverter coupled to the first energy storage device, a first transformer, a first diode and a capacitor. The first inverter includes a first switch and second switch in series. The first transformer transforms high voltage from the first energy storage device to the low voltage output from auxiliary power output terminal, and includes the primary winding and auxiliary winding. The primary winding is connected to the first energy storage device and the junction of the first and second switch, and the homonymous terminal of the secondary winding is connected to the auxiliary power output through the first diode, with the synonymous terminal connected to the earth. One end of the first capacitor is connected to the first diode cathode and the other end is connected to the earth.

20 Claims, 5 Drawing Sheets

(51) Int. Cl.

| | |
|---|---|
| *H02J 7/00* | (2006.01) |
| *H05B 41/28* | (2006.01) |
| *H02M 7/06* | (2006.01) |
| *H05B 41/36* | (2006.01) |
| *H02M 7/537* | (2006.01) |
| *G05F 1/46* | (2006.01) |
| *H02M 3/158* | (2006.01) |
| *B60L 1/00* | (2006.01) |
| *B60L 1/14* | (2006.01) |
| *B60L 50/40* | (2019.01) |
| *B60L 58/20* | (2019.01) |
| *H02M 3/156* | (2006.01) |

(52) U.S. Cl.
CPC ............... *B60L 58/20* (2019.02); *G05F 1/46* (2013.01); *H02M 3/158* (2013.01); *B60L 2210/10* (2013.01); *H02M 3/156* (2013.01); *H02M 3/1584* (2013.01); *Y02T 10/7005* (2013.01); *Y02T 10/7022* (2013.01); *Y02T 10/7066* (2013.01); *Y02T 10/7216* (2013.01)

(58) Field of Classification Search
CPC .... B60L 11/005; B60L 11/18; B60L 11/1868; B60L 2210/10; G05F 1/46; Y02T 10/7005; Y02T 10/7022; Y02T 10/7066; Y02T 10/7216
USPC ....................................................... 307/1–87
See application file for complete search history.

(56) References Cited

U.S. PATENT DOCUMENTS

| | | | | |
|---|---|---|---|---|
| 7,518,886 | B1* | 4/2009 | Lai .......................... | H02P 8/12 363/17 |
| 7,728,456 | B2 | 6/2010 | Kusubayashi | |
| 8,907,622 | B2 | 12/2014 | Itagaki et al. | |
| 2002/0122326 | A1 | 9/2002 | Chen et al. | |
| 2004/0037092 | A1* | 2/2004 | Kurio .................. | H02M 3/3376 363/17 |
| 2006/0083029 | A1* | 4/2006 | Yoshida ............ | H02M 3/33592 363/6 |
| 2009/0058329 | A1 | 3/2009 | Ichikawa | |
| 2011/0051468 | A1* | 3/2011 | Kyono .................. | H02M 3/285 363/21.02 |
| 2012/0126733 | A1 | 5/2012 | El-Refaie et al. | |
| 2012/0187919 | A1 | 7/2012 | Andersson et al. | |
| 2012/0221287 | A1* | 8/2012 | Ioannidis ................. | G01K 1/12 702/132 |
| 2014/0225439 | A1* | 8/2014 | Mao .................... | H02M 3/3376 307/31 |
| 2014/0232187 | A1 | 8/2014 | Ryan et al. | |
| 2014/0281638 | A1 | 9/2014 | Drobnik | |
| 2014/0319919 | A1* | 10/2014 | Fu ......................... | H02M 7/539 307/82 |
| 2015/0092451 | A1* | 4/2015 | Popovici ................. | H02M 3/28 363/17 |
| 2015/0162845 | A1* | 6/2015 | Lee ................... | H02M 3/33569 363/17 |
| 2016/0294304 | A1* | 10/2016 | Li .......................... | B60L 1/006 |

FOREIGN PATENT DOCUMENTS

| | | |
|---|---|---|
| CN | 201478863 U | 5/2010 |
| CN | 102222976 A | 10/2011 |
| CN | 104038037 A | 9/2014 |
| EP | 2012406 A1 | 1/2009 |
| EP | 2682309 A1 | 1/2014 |

OTHER PUBLICATIONS

Machine Translation and First Office Action and Search issued in connection with corresponding CN Application No. 201510149774.5 dated May 22, 2018.

Second Office Action issued in connection with corresponding MX Application No. MX/A/2016/004110 dated Nov. 22, 2018.

Hasan, S.M.N. et al., "Features and challenges for Auxiliary Power Module (APM) design for hybrid/electric vehicle applications", Vehicle Power and Propulsion Conference (VPPC), 2011 IEEE, IEEE Xplore, pp. 1-6, Sep. 6-9, 2011, Chicago, IL.

European Search Report and Written Opinion issued in connection with corresponding EP Application No. 16162904.3 dated Sep. 8, 2016.

English Translation of Chinese Second Office Action for corresponding CN Application No. 201510149774.5, dated Jan. 31, 2019.

* cited by examiner

POWER SUPPLY SYSTEM AND ENERGY STORAGE SYSTEM

TECHNICAL FIELD

Embodiments of the present invention are generally related to the energy supply technology domain, especially related to power supply systems as well as energy storage systems with power supply systems.

BACKGROUND

Following the continual increase in global oil consumption and increasingly prominent environmental issues, reducing energy consumption and the development and use of reusable energy sources are a rapidly accelerating development trends. Following these developments, a new type of electric vehicle using renewable energy sources has come into being, including pure electric vehicles and hybrid vehicles.

In the electric power system, there are usually two kinds of voltage, high voltage and low voltage. High voltage is for battery voltage, the total energy for the running and operation of the vehicle provided by the power battery. Low voltage is controlled voltage, which can be used for the motor control unit, dashboard and various lamps, etc. In the existing power system of the electric vehicle power system, a separate auxiliary power unit is usually needed for the high voltage of battery (for example, 48 v converted to low voltage 12 v). However, in the existing independent auxiliary power, a separate inverter is needed to provide auxiliary power supply, which results in high costs. In consideration of the space limitations of electric vehicles, adding this independent power supply is bound to take up a large amount of space. Therefore, within the limited space in this power system configuration, the separate auxiliary power structure will certainly cause low power density.

Therefore, it is necessary to provide an improved system to solve at least one of the problems mentioned above.

BRIEF DESCRIPTION

One aspect of this invention is to provide a power supply system, used to provide auxiliary power output and includes a first energy storage device, a first inverter coupled to the first energy storage device, a first transformer, a first diode and a capacitor. The first inverter includes a first switch and second switch in series. The first transformer transforms high voltage from the first energy storage device to the low voltage output from auxiliary power output terminal, and includes the primary winding and auxiliary winding. The primary winding of the transformer is connected to the first energy storage device and the junction of the first and second switch, and the homonymous terminal of the secondary winding of the terminal is connected to the auxiliary power output through the first diode, with the synonymous terminal connected to the earth; One end of which is connected to the first diode cathode and the other end is connected to the earth.

Another aspect of this invention is to provide an energy storage system, which includes all the items of power supply systems described above, used to manage and control the energy management system. The output terminal of the first converter in the power system is connected to a DC bus load line.

Compared with the existing independent auxiliary power structure, the power system and energy storage system in this invention use an integrated auxiliary power structure. This integrated structure only uses a few extra elements, but is able to realize all the necessary functions of an auxiliary power supply, thus simplifying the power supply design. The structure does not take up much space. Therefore, the power supply system and energy storage system in this invention are small, but still able to provide a high power density. In addition, this power supply system and the energy storage system invention can greatly reduce costs.

BRIEF DESCRIPTION OF THE DRAWINGS

You can get a clearer understanding of these and other characteristics, aspects and advantages of this invention by referring to the attached Figures when reading the following detailed explanation. In the attached Figures, the same element reference numbers are used to denote the same parts in all Figures.

DETAILED DESCRIPTION

Unless otherwise defined, the technical terms or scientific terms used in the claims and specification should be the ordinary meaning understood by a person of ordinary skill in the technical field of the present invention. "First", "second" and similar words used in the present specification and the claims do not denote any order, quantity, or importance, but are just used to distinguish different components. "A" or "a" and similar words do not mean a single unit, but indicate the presence of at least one. "Comprises" or "possesses" and other similar words imply that an element or object appearing before the "comprises" or "possesses" covers enumerated elements or objects and equivalents elements thereof appearing after the "comprises" or "possesses", without excluding other elements or objects. "Connected" or "coupled" and other similar words are not limited to physical or mechanical connections, but may include electrical connections, either in a direct or indirect manner.

Figure 1:
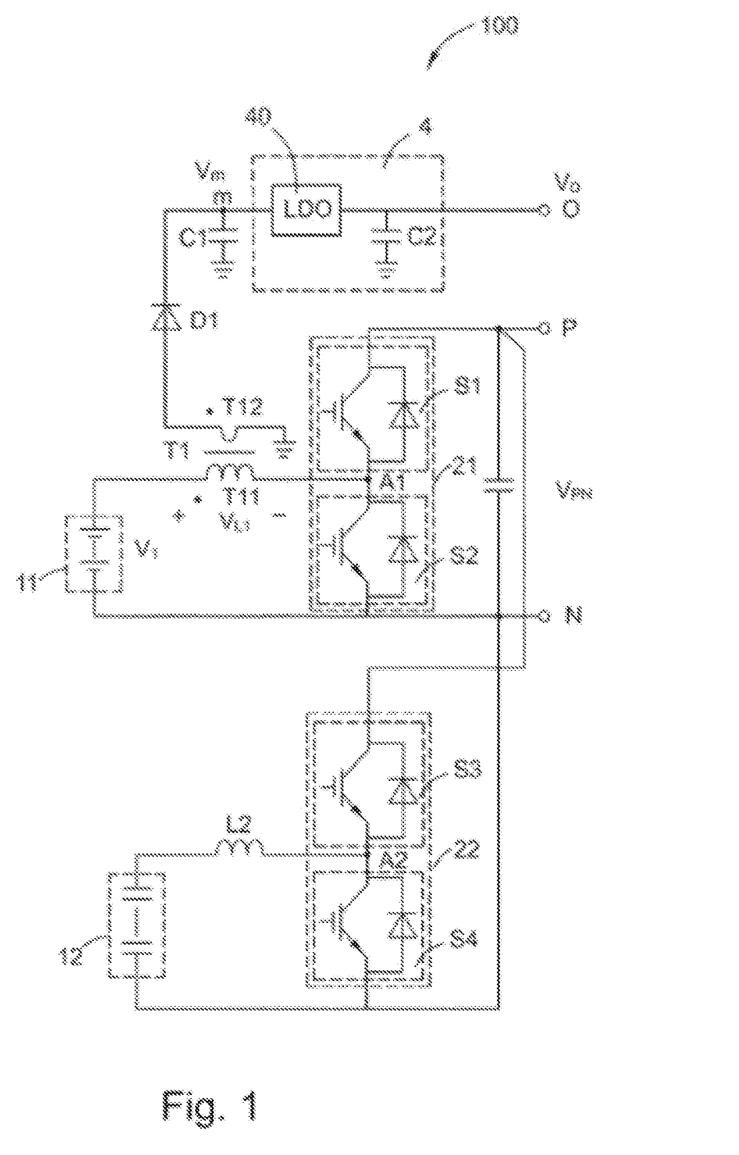
FIG. 1 shows a schematic circuit of one possible power supply system of an embodiment of the present invention.

FIG. 1 is a schematic circuit Figure of one possible power supply system embodying the method in this invention. As shown in FIG. 1, a specific implementation of this invention is the power supply system 100, used to provide auxiliary power output 0 and includes a first energy storage device 11, a first inverter 21 coupled to the first energy storage device 11, a first transformer T1, a first diode D1 and a first capacitor C1.

The first energy storage device 11 can include a battery, super capacitor, fuel cell or solar cell. In this specific implementation as shown in FIG. 1, the first energy storage device 11 is a battery.

The first inverter includes a first switch S1 and second switch S2 in series. The first switch S1 and second switch S2 can include a semiconductor switch and diode connected in parallel. An example of a semiconductor switch is an insulated gate bipolar transistor (Insulated Gate Bipolar Transistor, IGBT). Of course, other types of semiconductor switches can also be used.

The first transformer T1 is used to transform the high voltage from the first energy storage device 11 (the battery) to low voltage $V_o$ from the auxiliary power output terminal 0 (e.g., for 12 v). The first transformer T1 includes the primary winding T11 and secondary winding T12. The primary winding T11 of the first transformer T1 is connected between the first energy storage device 11 and connection point A1 of the first switch S1 and second switch S2 of the first converter 21. For example, in the example shown in FIG. 1, the primary winding T11 of the first transformer T1 is connected with positive electrode side of the first energy storage device 11, and the negative electrode end of the primary winding 11 of the first transformer T1 is connected to the connection point A1 between the first switch S1 and second switch S2. The terminal of the secondary winding T12 of the transformer T1 is connected to the auxiliary power output end 0 by the first diode D1, and the end point of the auxiliary winding T12 of first transformer T1 is connected to the earth.

One end of the first capacitor C1 is connected to the diode D1 cathode, and the other end of the first capacitor C1 is connected to the earth.

In this specific implementation of the invention, as shown in FIG. 1, the power supply system 100 can also include a filtering circuit 4. The filtering circuit 4 is coupled between the connection point m of the first diode D1 and first capacitor C1 and the auxiliary power output 0. The filter circuit 4 is to carry out fine voltage $V_m$ filtering at the connection point m between the first diode D1 and first capacitor C1 in an example, the filter circuit 4 can include a low pressure drop voltage stabilizer (Low Dropout Regulator, LDO) 40 and a second capacitor C2. The input of the LDO 40 is coupled to the connection point m of the first diode D1 and first capacitor C1. One end of the second capacitor C2 is connected to the output of the LDO 40, and the other end of the second capacitor C2 is connected to the earth.

Referring to FIG. 1, the primary winding T11 $N_{11}$ of this first transformer T1$N_{12}$, secondary winding T12 of first transformer T1, and primary winding T11 of the first transformer T1 are connected to the connection point m between the first diode D1 and first capacitor C1$V_m$.

According to the FIG. 1, the primary winding T11 of transformer T1 voltage V of both ends satisfy the following formula:

$$V_1 - V_{PN} \leq V_{L1} \leq V_1$$

In the formula, $V_1$ represents the voltage of the first energy storage device 11 and $V_{PN}$ represents the voltage between the two outputs P and N from the first transformer 21.

Figure 2:
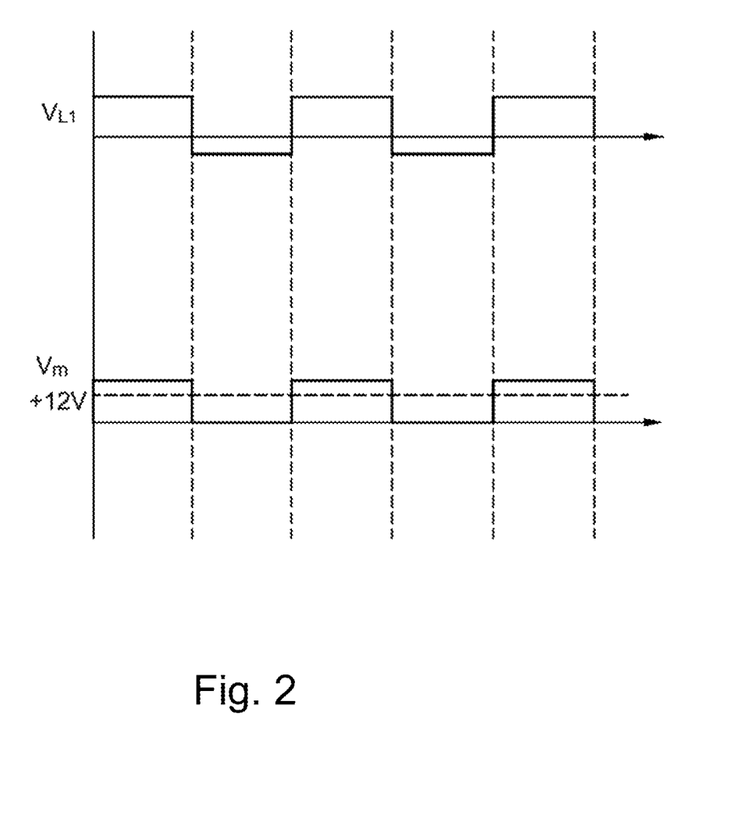
FIG. 2 shows several voltage waveforms for the power supply system shown in FIG. 1.

FIG. 2 shows several voltage waveforms for the power supply system 100 shown in FIG. 1. Combining FIGS. 1 and 2, when the first transformer T1 voltage at the ends of the original winding T11 VL1 is forward voltage $V_1$, the diode D1 is conducting and there is voltage output from the connecting point m between the first diode D1 and the first capacitor C1$V_m$. When the first transformer T1 original winding T11 VL1 is reverse voltage $V_1-V_{PN}$, the diode D1 is cut off, and there is no voltage output at the connection point $_m$ between the first diode D1 and first capacitor C1, that is, the voltage Vm at the connection point between the first diode D1 and the first capacitor C1 is 0.

Therefore, the number of turns on the auxiliary winding T12 of the first transformer T1$N_{12}$ winding can be selected according to the following formula:

$$N_{12} = \frac{N_{11} \times V_m}{V_1}$$

the power system 100 as shown in FIG. 1 does not include the filter circuit 4. The auxiliary power output end O output voltage VO is the output voltage at the connection point m between the first diode D1 and the first capacitor C1$V_m$. When the power supply system 100 as shown in FIG. 1 does include a filter circuit 4, the auxiliary power supply output O output voltage VO is the output voltage at the connection point between the first diode D1 and first capacitor C1 after filtering $V_m$ (as shown in FIG. 2 +12 v). Therefore, if the voltage of the first energy storage device 11$V_1$, the output voltage V0 of the auxiliary power output terminal 0, and the number of turns on the primary winding T11 of the first transformer T1 are known $N_{11}$, the number of required turns on the auxiliary winding T12 of the first transformer T1 can easily be obtained $N_{12}$.

In the specific implementation method shown in FIG. 1, the power supply system 100 can be a multi-source system. Therefore, the power system 100 can also include a second energy storage device 12 and a second converter 22 coupled to the second energy storage device 12. The output terminal of the second transformer 22 and the output terminals P and N of the first transformer 21 are connected together. There is a second inductor L2 between the second energy storage device 12 and the second transformer 22.

The second energy storage device 12 can include a battery, super capacitor, a fuel cell and solar cell that is different from that of the first energy storage device 11. In the power system 100 shown in FIG. 1, the second energy storage device 12 is a super capacitor.

The second transformer 22 includes a third S3 and fourth switch S4 in series. Similarly, the third switch S3 and fourth switch S4 can include a semiconductor switch and diode connected in parallel. An example of a semiconductor switch is an insulated gate bipolar transistor (Insulated Gate Bipolar Transistor, IGBT). Of course, other types of semiconductor switches can also be used.

In the power supply system 100 in FIG. 1, an auxiliary winding needs to be added via the tap between the inductor on the first transformer 21 on the current electric system, thereby changing the original existing inductor into a 9transformd 1 er (the first transformer T1). Adding a diode (the first diode D1) and a capacitor (the first capacitor C1) can realize an auxiliary power supply, thereby integrating an auxiliary power supply structure into the power supply system 100.

Compared with the existing independent auxiliary power structure, this invention uses an integrated auxiliary power structure 100. This integrated structure only uses a few extra elements, but is able to realize all the necessary functions of an auxiliary power supply, thus simplifying the power supply design. The structure does not take up much space. Therefore, the power supply system and energy storage system 100 in this invention are small, but still able to provide a high power density. In addition, this power supply system 100 invention can greatly reduce costs.

Figure 3:
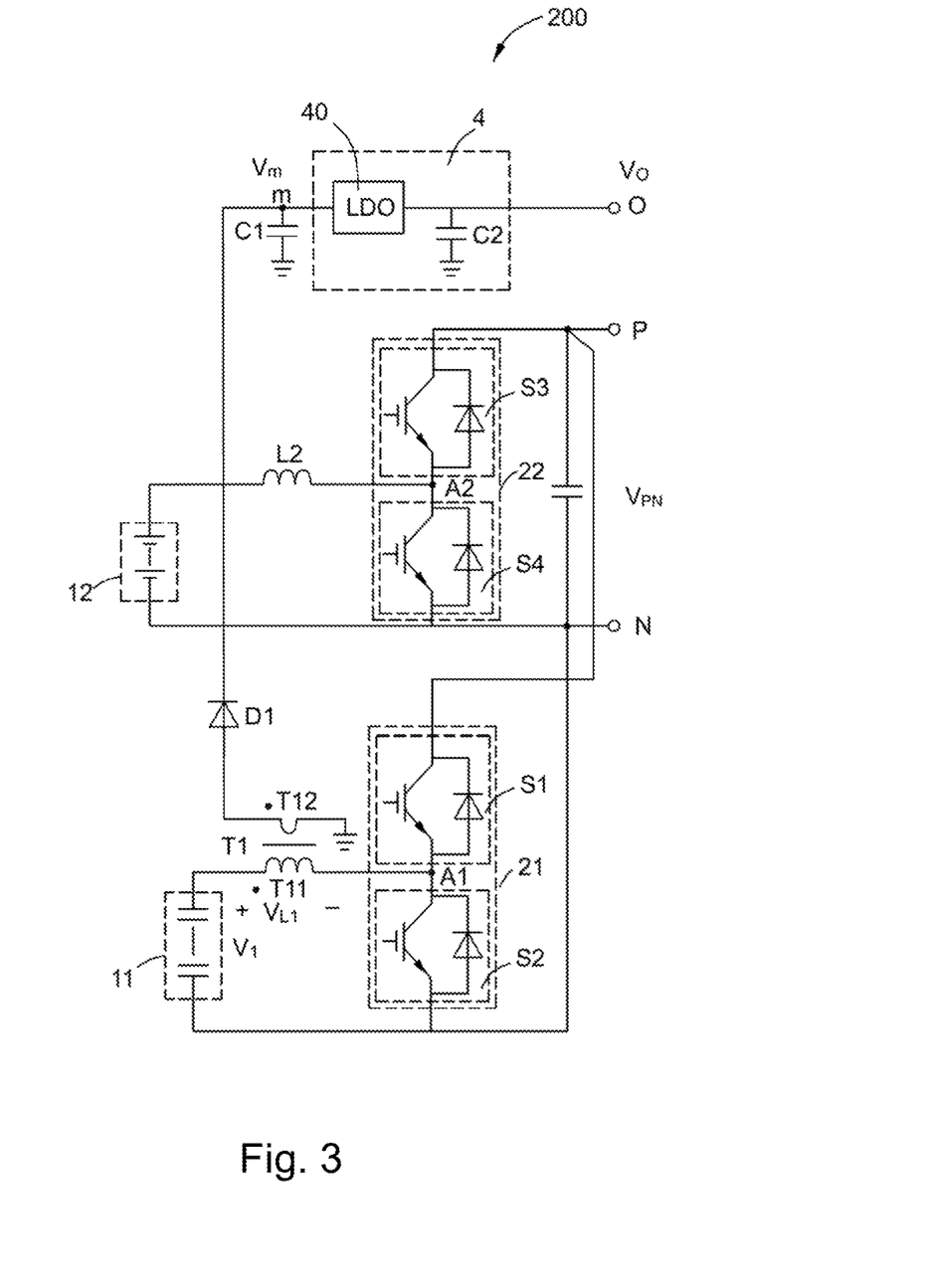
FIG. 3 shows a schematic circuit of another possible power supply system in an embodiment of the present invention.

FIG. 3 is a schematic circuit Figure of another possible power supply system 200 embodying the method in this invention. In FIG. 3, the difference with power supply system 100 in FIG. 1 is that in the power system 200 shown in FIG. 3, the second energy storage device 11 is a super capacitor. The first transformer T1 is used to transform the high voltage from the super conductor to low voltage$_o$ from the auxiliary power output terminal 0.

In the specific implementation method shown in FIG. 3, the power supply system 200 can be a multi-source system. Therefore, the power system 200 can also include a second energy storage device 12 and a second converter 22 coupled to the second energy storage device 12. The output terminal of the second transformer 22 and the output terminals P and N of the first transformer 21 are connected together. There is a separate conductor L2 between second energy storage device 12 and converter 22 second converter.

However, the difference with power supply system 100 in FIG. 1 is that in the power system 200 shown in FIG. 3, the second energy storage device 12 is a battery.

The power supply system shown in FIG. 3 can achieve an efficiency comparable to the power supply system 100 as shown in FIG. 1 and is not repeated here.

Figure 4:
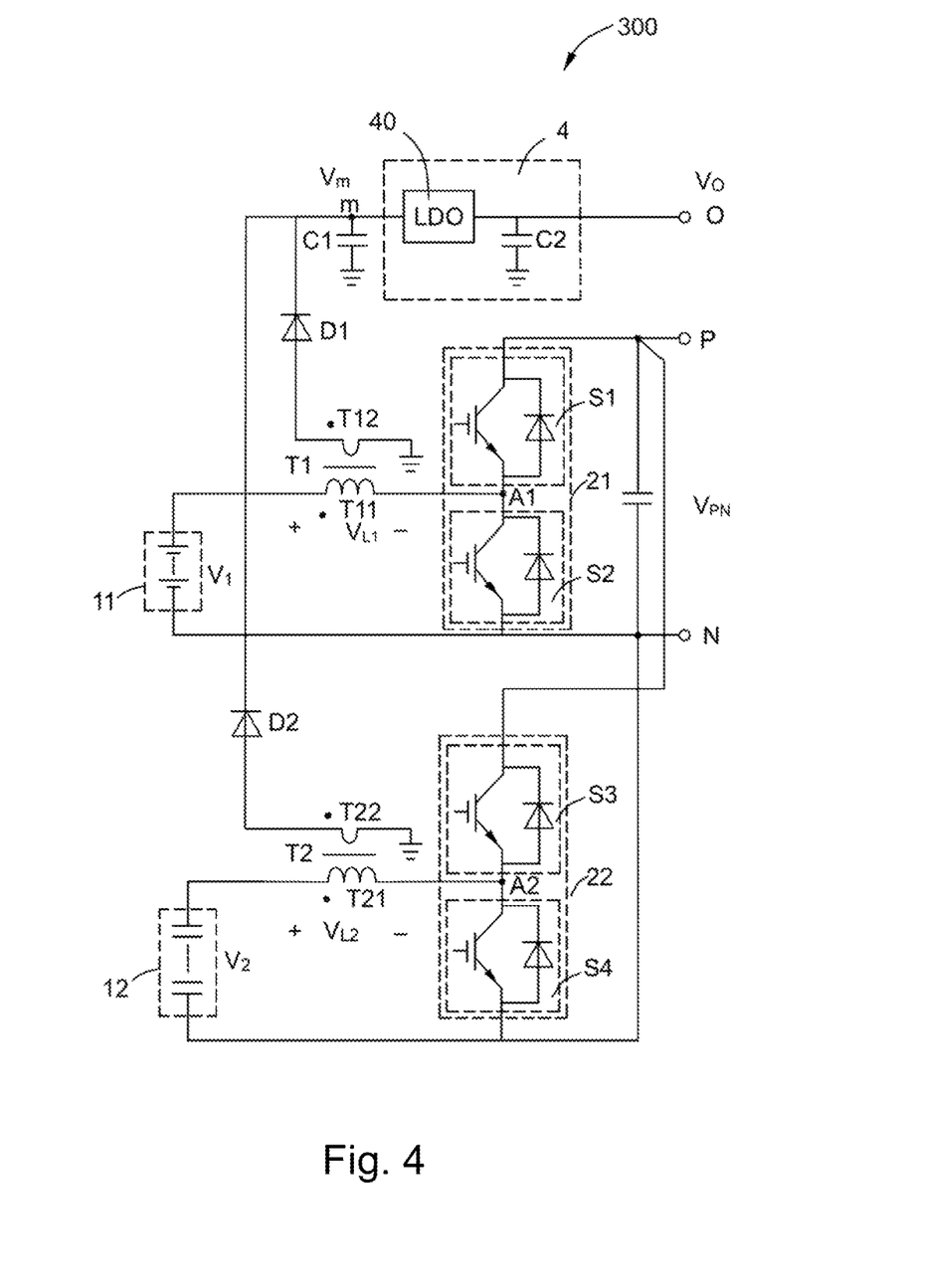
FIG. 4 shows a schematic circuit of a further possible power supply system of an embodiment of the present invention.

FIG. 4 is a schematic circuit Figure of another possible power supply system 300 embodying the method in this invention. In the specific implementation as shown in FIG. 4, the power supply system 300 is a multi-source system. Similar to the system 100 shown in FIG. 1, the power supply system 300 is a multi-source system 100 as shown in to FIG. 4, used to provide auxiliary power output 0 and includes a first energy storage device 11, a first inverter 21 coupled to the first energy storage device 11, a first transformer T1, a first diode D1 a second energy storage device 12 and a second transformer 22 coupled with the second energy storage system 12.

The difference with the multi-source system 100 as shown in FIG. 1 is that the power supply system 300 shown in FIG. 4 also includes second transformer T2. The second transformer T2 transforms the high voltage from the second energy storage system 12 into low voltage $V_O$ from the auxiliary voltage output. The second transformer T2 includes the primary winding T21 and secondary winding T22. The primary winding T21 of the second transformer T2 is connected between the first energy storage device 12 and connection point A2 of the third switch S3 and fourth switch S4 of the second converter 22. For example, in the example shown in FIG. 4, the primary winding T11 of the second transformer T2 is connected with positive electrode side of the second energy storage device 12, and the negative electrode end of the primary winding T21 of the second transformer T2 is connected to the connection point A2 between the third switch S3 and fourth switch S4. The terminal of the secondary winding T22 of the transformer T2 is connected the connecting point m between the first diode D1 and the first capacitor C1 via the second diode D2, and the other terminal is connected to the earth.

In this specific implementation of this invention, as shown in FIG. 4 power supply system 300 can also include 4 filtering circuit, filtering circuit 4 coupled and connected to the m point of the first diode D1 and the junction of capacitor C1 and between the auxiliary power output O. The filter circuit 4 is to carry out fine voltage $V_m$ filtering at the connection point m between the first diode D1 and first capacitor C1. In an example, the filter circuit 4 can include a low pressure drop voltage stabilizer (LDO) 40 and a second capacitor C2. The input of the LDO 40 is coupled to the connection point m of the first diode D1 and first capacitor C1. One end of the second capacitor C2 is connected to the output of the LDO 40, and the other end of the second capacitor C2 is connected to the earth.

Referring to FIG. 4, the number of turns of primary winding T11 of this first transformer T1 is $N_{11}$, the number of turns of the secondary winding T12 of first transformer T1 is $N_{12}$, the voltage across the two terminals of the primary winding T11 for the transformer T1 $V_{L1}$, and the voltage at the connection point m between the first diode D1 and the first capacitor C1 is $V_m$. The number of turns of the primary winding T21 of the second transformer T2 is $N_{21}$, the number of turns on the auxiliary winding T22 of the second transformer T2 is $N_{22}$ and the voltage across the two terminals on the primary winding T21 for the second transformer is $V_{L2}$.

According to the FIG. 4, the primary winding T11 of transformer T1 voltage V of both ends satisfy the following formula:

$$V_1 - V_{PN} \leq V_{L1} \leq V_1$$

In the formula, $V_1$ represents the voltage of the first energy storage device 11 and $V_{PN}$ represents the voltage between the two outputs P and N from the first transformer 21.

According to the FIG. 4, the primary winding T21 of transformer T2 voltage $V_{L2}$ of both ends satisfy the following formula:

$$V_2 - V_{PN} \leq V_{L2} \leq V_2$$

In the formula, $V_2$ represents the voltage of the second energy storage device 12.

Figure 5:
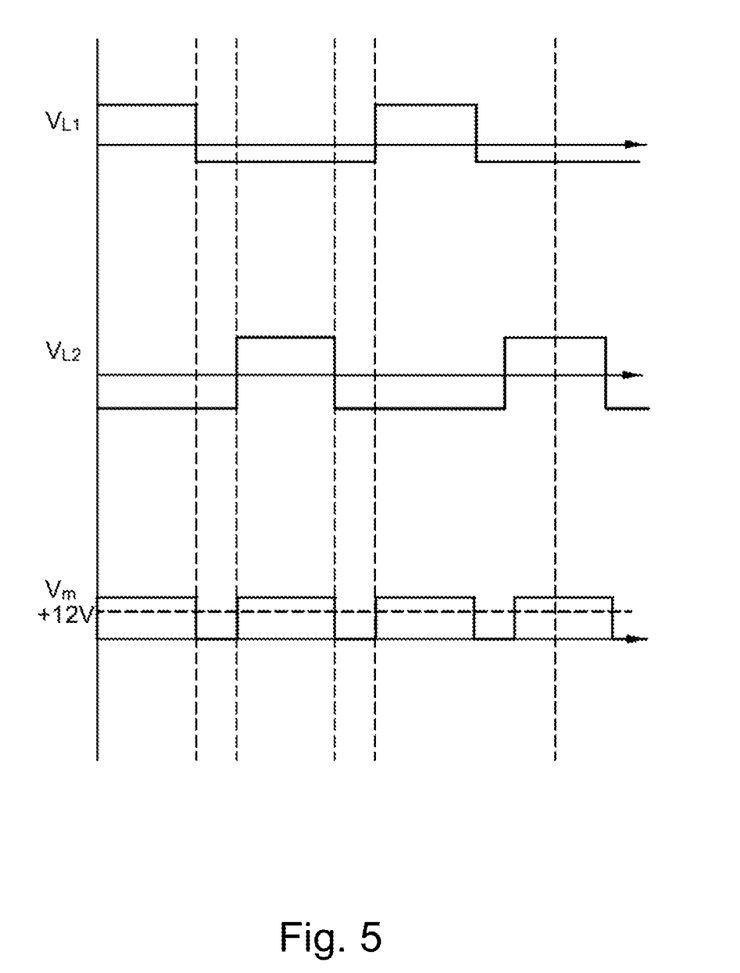
FIG. 5 shows several voltage waveforms for the power supply system shown in FIG. 4.

FIG. 5 shows several voltage waveforms for the power supply system 300 shown in FIG. 4. Combined with the reference as shown in FIG. 4 and FIG. 5, when the first primary side of transformer T1 $V_{L1}$ at the ends of the voltage for high voltage winding T11, while the second the T2 primary side of transformer voltage at the ends of the T21 $V_{L2}$ for low voltage, the first diode D1 conduction, while the second diode D2 deadline, at this point, the first diode D1 the voltages and the junction of a capacitor C1 m $V_m$ is equal to the first deputy winding of the transformer T1 T12 on both ends of the voltage; When the first transformer T1 $V_{L1}$ at the ends of the original winding T11 voltage to low voltage, and the second the T2 primary side of transformer voltage at the ends of the T21 $V_{L2}$ for high voltage, the first diode D1 deadline, while the second diode D2 conduction, at this point, the first diode D1 the voltages and the junction of a capacitor C1 m $V_m$ is equal to the second the T2 vice side of the transformer voltage at the ends of the T22; When the first primary side of transformer T1 $V_{L1}$ at the ends of the voltage and the second transformer winding T11 T2 of the original winding voltage at the ends of the T21 $V_{L2}$ are low voltage, the first diode is the second diode D1 and D2 are deadline, at this point, the first diode D1 and the junction of a capacitor C1 m no voltage output, namely the first diode D1 the voltages and the junction of a capacitor C1 m $V_m$ is 0.

Therefore, the number of turns on the auxiliary winding T12 of the first transformer T1 winding $N_{12}$ can be selected according to the following formula:

$$N_{12} = \frac{N_{11} \times V_m}{V_1}$$

Therefore, the number of turns on the auxiliary winding T22 of the first transformer T1 winding $N_{22}$ can be selected according to the following formula:

$$N_{22} = \frac{N_{21} \times V_m}{V_2}$$

the power system 300 as shown in FIG. 4 does not include the filter circuit 4. The auxiliary power output end 0 output voltage $V_O$ is the output voltage at the connection point m between the first diode D1 and the first capacitor C1$V_m$. When the power supply system 300 as shown in FIG. 4 does include a filter circuit 4, the auxiliary power supply output O output voltage $V_O$ is the output voltage $V_m$ at the connection point between the first diode D1 and first capacitor C1 after filtering (as shown in FIG. 5 +12 v). Therefore, in the known voltage of the first energy storage device 11$V_1$, 12 second energy storage device $V_2$, auxiliary power supply output voltage output voltage $V_O$, O you want the first turn of the original winding of transformer T1 T11 and $N_{11}$ second transformer T2 of the original winding turns for T21$N_{21}$, easily obtained first deputy winding of the transformer T1 T12 required $N_{12}$ and second transformer T2 of vice winding coils T22 the required number of turns $N_{22}$.

In the power supply system 300 in FIG. 5, an auxiliary winding needs to be added via the tap between the inductor on the first transformer 21 and each transformer in the second transformer 22 on the current electric system, thereby changing the original inductors on the first transformer 21 and second transformer 22 into a two transformers (the first transformer T1 second transformer T2). Adding two diodes (the first diode D1 and second diode D2) and a capacitor (the first capacitor C1) can realize an auxiliary power supply, thereby integrating an auxiliary power supply structure into the power supply system 300.

Compared with the existing independent auxiliary power structure, this invention as shown in FIG. 4 uses an integrated auxiliary power structure 300. This integrated structure only uses a few extra elements, but is able to realize all the necessary functions of an auxiliary power supply, thus simplifying the power supply design. The structure does not take up much space. Therefore, the power supply system and energy storage system 300 in this invention are small, but still able to provide a high power density. In addition, this power supply system 300 invention can greatly reduce costs.

In addition, the invention also provides a kind of energy storage system. The energy storage system can include any of the power supply system 100, 200 or 300 in FIG. 1, FIGS. 3 and FIG. 4. In systems 100, 200 and 300, the output terminals P and N of the first converter are connected to the DC bus load (not shown).

The energy storage system also includes 100, 200, 300, used for power supply system for management and control of energy management system (not shown). Under the power system 100, 200, 300 including first energy storage device of the 11 cases, energy management system used to control the first energy storage device 11; When power systems, 100, 200, 300, including the first energy storage device 11 and the second energy storage device of 12 cases, energy management system used in the first energy storage device in 11 and 12 to control the second energy storage device.

The energy storage system can be used as a dynamic application, applied to electric vehicles, or it can be used as a static application, applied in power grids.

When the energy storage system of this invention is applied to electric vehicles, the DC bus load line of the energy storage system can includes the drive system of electric vehicle.

When the energy storage system of this invention as static applications, the DC bus load line of the energy storage system of this present invention can include the inverter and the power grid of the inverter.

The energy storage system of this invention as mentioned above is smaller and has a higher power density when used as shown in power supply systems 100, 200 and 300. In addition, this invention of the energy storage system can greatly reduce the cost.

Although the present invention is described with reference to specific implementation methods, technicians in the field should understand that many modifications and variations may be made for the present invention. Therefore, it should be aware that, intention of the claims lies in all the modifications and variations covered in a real concept and scope of the present invention.

What is claimed is:

1. A power supply system, comprising:
   an auxiliary power supply output terminal for providing an auxiliary power supply;
   a first energy storage device;
   a first converter comprising a first switch and a second switch which are series-connected, wherein the first converter is coupled to the first energy storage device;
   a first transformer that transforms a high voltage from the first energy storage device into a low voltage output from the auxiliary power supply output terminal and comprising a primary winding and a secondary winding, wherein the primary winding of the first transformer is connected between the first energy storage device and a connecting point of the first and the second switches, and a first terminal of the secondary winding of the first transformer is connected to the auxiliary power supply output terminal via a first diode and an opposite terminal thereof is grounded; and
   a first capacitor, wherein one terminal of the first capacitor is connected to a negative electrode of the first diode and the other terminal thereof is grounded.

2. The power supply system of claim 1, further comprising:
   a filter circuit coupled between a connecting point of the first diode and the first capacitor and the auxiliary power supply output terminal.

3. The power supply system of claim 2, wherein the filter circuit comprises:
   a low drop regulator, wherein an input of the low drop regulator is coupled to the connecting point of the first diode and the first capacitor; and
   a second capacitor, wherein one terminal of the second capacitor is connected to an output of the low drop regulator and the other terminal thereof is grounded.

4. The power supply system of claim 1, wherein a number of turns of the secondary winding of the first transformer, $N_{12}$, is selected according to the following equation:

$$N_{12} = \frac{N_{11} \times V_m}{V_1}$$

where $N_{11}$ represents a number of turns of the primary winding of the first transformer, $V_1$ represents a voltage of the first energy storage device, and $V_m$ represents a voltage at a connecting point of the first diode and the first capacitor.

5. The power supply system of claim 1, further comprising:
   a second energy storage device; and a second converter comprising a third switch and a fourth switch which are series-connected, wherein the second converter is coupled to the second energy storage device and output terminals of the second converter are connected together with output terminals of the first converter.

6. The power supply system of claim 5, wherein the first energy storage device comprises a battery and the second energy storage device comprises an ultracapacitor; or the first energy storage device comprises an ultracapacitor and the second energy storage device comprises a battery.

7. The power supply system of claim 5, further comprising:
a second transformer that transforms a high voltage from the second energy storage device into the low voltage and comprising a primary winding and a secondary winding, wherein the primary winding of the second transformer is connected between the second energy storage device and a connecting point of the third and the fourth switches, and a first terminal of the secondary winding of the second transformer is connected to a connecting point of the first diode and the first capacitor via a second diode and an opposite terminal thereof is grounded.

8. The power supply system of claim 7, further comprising:
a filter circuit coupled between the connecting point of the first diode and the first capacitor and the auxiliary power supply output terminal.

9. The power supply system of claim 8, wherein the filter circuit comprises:
a low drop regulator, wherein an input of the low drop regulator is coupled to the connecting point of the first diode and the first capacitor; and
a second capacitor, wherein one terminal of the second capacitor is connected to an output of the low drop regulator and the other terminal thereof is grounded.

10. The power supply system of claim 7, wherein a number of turns of the secondary winding of the second transformer, $N_{22}$, is selected according to the following equation:

$$N_{22} = \frac{N_{21} \times V_m}{V_2}$$

wherein $N_{21}$ represents a number of turns of the primary winding of the second transformer, $V_2$ represents a voltage of the second energy storage device, and $V_m$ represents a voltage at the connecting point of the first diode and the first capacitor.

11. An energy storage system, comprising:
a power supply system having an auxiliary power supply output terminal for providing an auxiliary power supply and comprising:
a first energy storage device;
a first converter comprising a first switch and a second switch which are series-connected, wherein the first converter is coupled to the first energy storage device and output terminals of the first converter are connected to a DC link load;
a first transformer that transforms a high voltage from the first energy storage device into a low voltage output from the auxiliary power supply output terminal and comprising a primary winding and a secondary winding, wherein the primary winding of the first transformer is connected between the first energy storage device and a connecting point of the first and the second switches, and a first terminal of the secondary winding of the first transformer is connected to the auxiliary power supply output terminal via a first diode and an opposite terminal thereof is grounded; and
a first capacitor, wherein one terminal of the first capacitor is connected to a negative electrode of the first diode and the other terminal thereof is grounded; and
an energy management system that controls the first energy storage device.

12. The energy storage system of claim 11, further comprising:
a filter circuit coupled between a connecting point of the first diode and the first capacitor and the auxiliary power supply output terminal.

13. The energy storage system of claim 12, wherein the filter circuit comprises:
a low drop regulator, wherein an input of the low drop regulator is coupled to the connecting point of the first diode and the first capacitor; and
a second capacitor, wherein one terminal of the second capacitor is connected to an output of the low drop regulator and the other terminal thereof is grounded.

14. The energy storage system of claim 11, wherein a number of turns of the secondary winding of the first transformer, $N_{12}$, is selected according to the following equation:

$$N_{12} = \frac{N_{11} \times V_m}{V_1}$$

where $N_{11}$ represents a number of turns of the primary winding of the first transformer, $V_1$ represents a voltage of the first energy storage device, and $V_m$ represents a voltage at a connecting point of the first diode and the first capacitor.

15. The energy storage system of claim 11, further comprising:
a second energy storage device; and
a second converter comprising a third switch and a fourth switch which are series-connected, wherein the second converter is coupled to the second energy device, output terminals of the second converter are connected together with the output terminals of the first converter, and the energy management system is further configured to control the second energy storage device.

16. The energy storage system of claim 15, further comprising:
a second transformer that transforms a high voltage from the second energy storage device into the low voltage and comprising a primary winding and a secondary winding, wherein the primary winding of the second transformer is connected between the second energy storage device and a connecting point of the third and the fourth switches, and a first terminal of the secondary winding of the second transformer is connected to a connecting point of the first diode and the first capacitor via a second diode and an opposite terminal thereof is grounded.

17. The energy storage system of claim 16, further comprising:
a low drop regulator, wherein an input of the low drop regulator is coupled to the connecting point of the first diode and the first capacitor; and a second capacitor, wherein one terminal of the second capacitor is connected to an output of the low drop regulator and the other terminal thereof is grounded.

18. The energy storage system of claim 16, wherein a number of turns of the secondary winding of the second transformer, $N_{22}$, is selected according to the following equation:

$$N_{22} = \frac{N_{21} \times V_m}{V_2}$$

wherein $N_{21}$ represents a number of turns of the primary winding of the second transformer, $V_2$ represents a voltage of the second energy storage device, and $V_m$ represents a voltage at the connecting point of the first diode and the first capacitor.

19. The energy storage system of claim 11, wherein the DC link load comprises an electric drive system of an electric vehicle.

20. The energy storage system of claim 11, wherein the DC link load comprises an inverter and a power grid connecting with the inverter.

* * * * *